TAPE GUIDE

Filed June 1, 1965

INVENTORS.
JOSEPH MOLINA
HERBERT MORELLO
JOHN E. LOPEZ

BY Edward M. Fassell
ATTORNEY

United States Patent Office 3,319,861
Patented May 16, 1967

3,319,861
TAPE GUIDE
Joseph Molina, Minneapolis, Minn, and Herbert Morello, Utica, and John E. Lopez, Ilion, N.Y., assignors to Sperry Rand Corporation, New York, N.Y., a corporation of Delaware
Filed June 1, 1965, Ser. No. 460,429
9 Claims. (Cl. 226—199)

This invention relates to tape guides, and more particularly to tape guides for compensating for variations in tape widths during operation.

Magnetic tapes included in computer systems generally involve a plurality of parallel tracks having information stored thereon in the form of magnetized areas. A multi-head transducer unit is generally aligned with the tracks and used to read and write information onto and from the magnetic tape. Since magnetic bits of information on the different tracks are generally aligned with respect to each other and are read in parallel from the tape, it is important to minimize any possible misalignment of the bits of information on the tracks. For example, misalignment of the bits of information may result in some bits being read before or after other bits of information when all the bits should be read simultaneously. This misalignment in magnetic tape is generally referred to as skewing. In order to minimize problems relating to such misalignment of bits of information, it is necessary that the tape be guided precisely while information is being read from or written on the tape.

In general, tape guides consist of cylindrical members and sometimes rollers. These cylindrical members or rollers include a pair of edge elements which tend to guide the tape while it is passed over the cylindrical member. As the tape guide elements are maintained in fixed relationship, several problems may result. If the tape width is too narrow, the tape will tend to move axially with respect to the cylindrical elements causing the information to be read or written off the alignments of the desired information track. On the other hand, if the tape is too wide the edges of the tape will tend to scrape against the guide elements causing excessive wear.

In order to overcome some of the difficulties involved in dealing with tapes of varying widths, many different types of guides have been employed. One such device has involved a fixed guide element and a movable guide element. The movable guide element is spring biased to push the tape against the fixed guide element during movement of the tape. If the width of the tape varies, the movable guide element, being resiliently mounted is moved axially with respect to the cylinder over which the tape rides between the guide elements to provide some compensating means. However, this latter type of guide also presents some problems. For example, when springs or other mechanical elements are employed to bias the movable element, it is difficult to adjust for the precise degree of tension required to properly guide the tape. Furthermore, the use of such mechanical bias arrangements have resulted in relatively complex structures which tend to vary in their characteristics over a period of time.

It is an object of this invention to provide an improved tape guide.

It is a further object of this invention to provide an improved tape guide wherein wear on the edge of the tape is minimized.

It is still a further object of this invention to provide an improved tape guide which compensates for variations in tape width during operation.

It is still a further object of this invention to provide an improved tape guide in which a floating edge guide is provided wherein the pressure actuating the floating edge is easily adjustable.

It is still a further object of this invention to provide an improved tape guide which permits cleaning of the tape during operation.

It is still a further object of this invention to provide an improved tape guide wherein the tape may be rewound at a rapid rate with a minimum amount of tape wear.

In accordance with the present invention, a tape guide includes a cylinder having a fluid pressure chamber adapted to receive tape thereon. An inlet and a plurality of outlet apertures are included in the cylinder. A fixed guide element receives one edge of the tape. A movable guide element is disposed to move over the cylinder to exert a guiding pressure against the other edge of the tape during operation. Means are provided for applying fluid pressure into the chamber to cause the movable guide element to move across the cylinder to guide the tape between the two guide elements. The movable guide element compensates for variations in the tape width. A cutting element is provided on the cylinder to clean the tape during operation.

Other objects and advantages of the present invention will be apparent and suggest themselves to those skilled in the art, from a reading of the following specification and claims, in conjunction with the accompanying drawing, in which:

Figure 1:
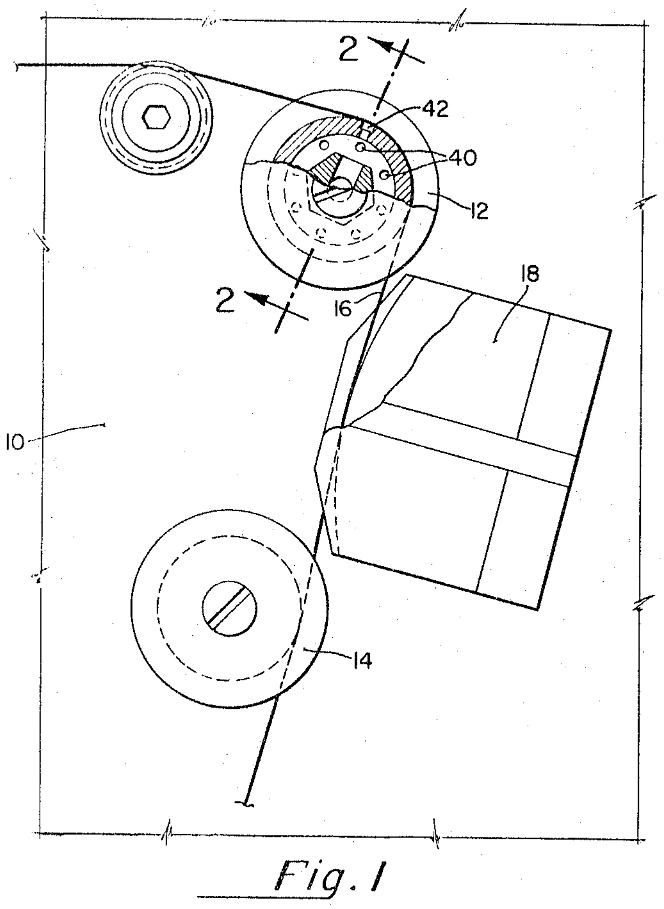
FIGURE 1 is a front part view of a portion of a tape transport system illustrating the present invention.
Figure 3:
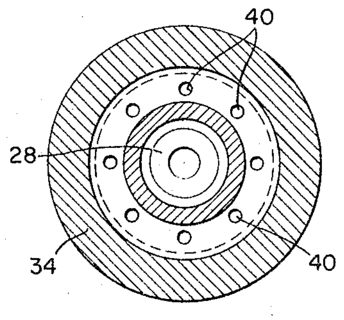
FIGURE 3 is a cross-sectional view taken along lines 3—3 of FIGURE 2.
Figure 2:
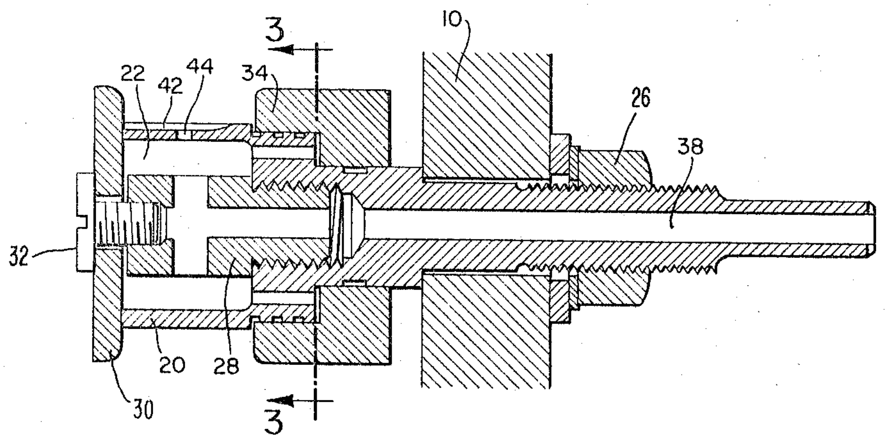
FIGURE 2 is a cross-sectional view taken along lines 2—2 of FIGURE 1 illustrating a tape guide, in accordance with the present invention.

Referring to the drawings, a tape transport system includes a front piece 10 having a pair of tape guide units 12 and 14. A magnetic tape 16 is guided toward and away from a magnetic head 18 by the guide units 12 and 14. An important feature of the present invention is to maintain the tape 16 in precise alignment before and after it contacts the magnetic head 18. Units 12 and 14 are substantially the same. Therefore, only the unit 12 will be described in detail.

The tape guide unit 12 includes a cylindrical member 20 having a pressure chamber 22 therein. The cylindrical member 20 is connected through an aperture of the front piece 10. The mounted unit is threaded and held in place on the front piece by means of a nut 26. A connecting element 28 is threadedly mounted to the cylindrical member 20. A fixed edge guide element 30 is mounted to the connecting element 28 by means of a screw 32.

A movable edge guide element 34 is disposed to ride over a portion of the cylindrical element 20. The movable element 34 is free to rotate as well as free to move axially with respect to the cylindrical element 20. The free rotation minimizes and averages wear of the element 34 throughout its surface. Providing a pin or other means to prevent rotation tends to produce excessive wear of certain parts of the element.

A source of low fluid pressure may be connected to a conduit 38 through the bore opening in the connecting element 28 into the pressure chamber 22. The low pressure developed within the chamber 22 is applied to a plurality of apertures 40 to the control the movement of the movable guide element 34. When the pressure within the chamber 22 is relatively low, the movable element 34 will tend to mave towards the left to engage one edge of the magnetic tape being guided. This movement forces the other edge of the tape against the fixed guide element 30.

The degree of pressure is controlled so that the pressure exerted by the movable element 34 is low enough to minimize wear or damage to the edges of the tape. At the same time, the pressure exerted is sufficient so that the element 34 is moved back and forth to compensate for slight variations in the width of the tape being transported.

It is well known that it is relatively easy to regulate fluid pressure to the desired degree. This may be accomplished by a simple valve mechanism, not illustrated.

An added feature of the present invention involves a cutting element 42 in the form of a cut-out within the cylindrical element 20. An aperture 44 within the cylinder permits dirt particles removed from the tape to be carried away. Thus, as the tape is being guided, it is also cleaned. The low pressure or vacuum within the chamber 20 permits the dirt or other particles removed from the tape to be carried away from the tape.

Another important feature of the present invention resides in the fact that, during a rewind operation, a relatively high pressure may be directed from the conduit 38 into the pressure chamber 22. This will result in the movable element 34 being moved away from the edge of the tape minimizing friction and wear during the rewind period. Also, because of the pressure within the chamber 22 the tape will pushed away from the cylindrical element 20 because of the fluid flowing through the aperture from the chamber 22.

The embodiments of the invention in which an exclusive property or privilege is claimed are defined as follows:

1. A tape guide mechanism comprising a tape receiving cylindrical element for receiving said tape along its flat surface when said tape is moved, an edge guide element for engaging one edge of said tape, said edge guide element being maintained in a fixed relationship with respect to said tape receiving cylindrical element, a movable edge guide element for exerting a force on the other edge of said tape during movement thereof, said movable edge guide element being dimensioned to movably ride over said cylindrical element, and means for pneumatically actuating said movable edge guide element to compensate for variations in the width of said tape during operation whereby said tape is continuously engaged by said edge guide elements during movement thereof.

2. A tape guide mechanism comprising a tap receiving cylindrical element for receiving said tape along its flat surface when said tape is moved, an edge guide element for engaging one edge of said tape, said cylindrical element including a plurality of spaced annular grooves, said edge guide element being maintained in a fixed relationship with respect to said tape receiving cylindrical element, a movable edge guide element for exerting a force on the other edge of said tape during movement thereof, said movable edge guide element being dimensioned to movably ride across the annular grooves of said cylindrical element, and a source of fluid for pneumatically actuating said movable edge guide element to compensate for variations in the width of said tape during operation whereby said tape is continuously engaged by both of said guide elements during movement thereof.

3. In combination with a tape transport system for moving tape across a magnetic head, a tape guide mechanism comprising a tape receiving cylindrical element for receiving said tape along its flat surface when said tape is moved, an edge guide element for engaging one edge of said tape, said cylindrical element including a plurality of spaced annular grooves disposed across a portion of its external surface, said edge guide element being maintained in a fixed relationship with respect to said tap receiving cylindrical element, a movable edge guide element for exerting a force on the other edge of said tape during movement thereof, said movable element being free to rotate about said cylindrical element and axially with respect to said cylindrical element, said movable edge guide element being dimensioned to movably ride across the annular grooves of said cylindrical element, and a source of fluid for pneumatically actuating said movable edge guide element to compensate for variations in the width of said tape during operation whereby said tape is continuously engaged by both of said guide elements during movement thereof.

4. The invention as set forth in claim 3 wherein said cylindrical element includes scraping means for removing particles from said tape.

5. A tape guide comprising a hollow cylindrical element adapted to receive a tape thereon, said cylindrical element forming a wall of a fluid pressure chamber within its interior portion, said chamber having an inlet and a plurality of apertures therein, a stop element attached to said cylindical element forming a wall of said fluid chamber and adapted to receive one edge of said tape, a movable cylindrical element disposed and dimensioned to ride across said cylindrical element, said cylindrical element being disposed to receive fluid pressure through said plurality of apertures from said chamber, a source of fluid pressure, and means for applying said fluid pressure to said chamber to cause said movable element to move across said cylindrical element to contact the other edge of said tape.

6. A tape guide comprising a cylindrical element adapted to receive a tape thereon, said cylindrical element including a fluid pressure chamber having an inlet and a plurality of apertures therein, a stop guide element attached to said cylindrical element and adapted to receive one edge of said tape, a movable cylindrical guide element disposed to move over said cylindrical element, said cylindrical element being disposed to receive fluid pressure through said plurality of apertures from said chamber, and means for applying fluid pressure to said chamber to cause said movable guide element to move across said cylindrical element to contact the other edge of said tape whereby said tape is guided across said cylindrical element and said movable element is moved in accordance with variations in the widths of said tape.

7. A tape guide comprising a hollow cylindrical element adapted to receive a tape thereon, said cylindrical element forming a wall of a fluid pressure chamber within its interior portion, said chamber having an inlet and a plurality of apertures therein, said cylindrical element including a plurality of spaced annular grooves about its exterior surface, a stop element attached to said cylindrical element forming a wall of said fluid chamber and adapted to receive one edge of said tape, a movable cylindrical element disposed and dimensioned to ride across said annular grooves of said cylindrical element, said cylindrical element being disposed to receive fluid pressure through said plurality of apertures from said chamber, a source of fluid pressure, and means for applying said fluid pressure to said chamber to cause said movable element to move across said cylindrical element to contact the other edge of said tape whereby said tape is guided across said cylindrical element and said movable element is moved in accordance with variations in the width of said tape.

8. In combination with a tape transport system for moving tape across a magnetic head, a tape guide comprising a hollow cylindrical element adapted to receive a tape thereon, said cylindrical element forming a wall of a fluid pressure chamber within its interior portion, said chamber having an inlet and a plurality of apertures therein, said cylindrical element including a plurality of spaced annular grooves disposed across a portion of its exterior surface, a stop element attached to said cylindrical element forming a wall of said fluid chamber and adapted to receive one edge of said tape, a movable cylindrical element disposed and dimensioned to ride across said annular grooves of said cylindrical element, said movable cylindrical element, being free to rotate about said cylindrical element and to be moved axially with respect to said cylindrical element, said cylindrical element being disposed to receive fluid pressure through said plurality of apertures from said chamber, a source of fluid pressure, and means for applying said fluid pressure to said chamber to cause said movable element to move across said cylindrical element to contact the other edge of said tape whereby said tape is guided across said cylindrical element and said movable element is moved in accordance with variations in the width of said tape.

9. The invention as set forth in claim 8 wherein said cylindrical element includes scraping means for said tape and an aperture to permit particles removed from said tape to pass therethrough into said fluid chamber.

References Cited by the Examiner

UNITED STATES PATENTS

| | | | |
|---|---|---|---|
| 2,142,606 | 1/1939 | Debrie | 226—198 |
| 3,032,006 | 5/1962 | Kahn et al. | 271—59 X |

M. HENSON WOOD, Jr., *Primary Examiner.*

J. N. ERLICH, *Assistant Examiner.*